United States Patent Office 3,182,978
Patented May 11, 1965

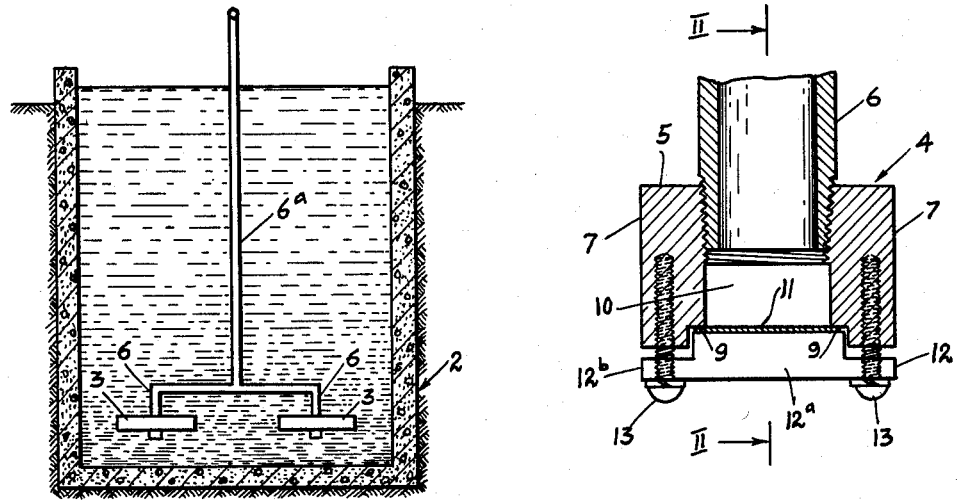
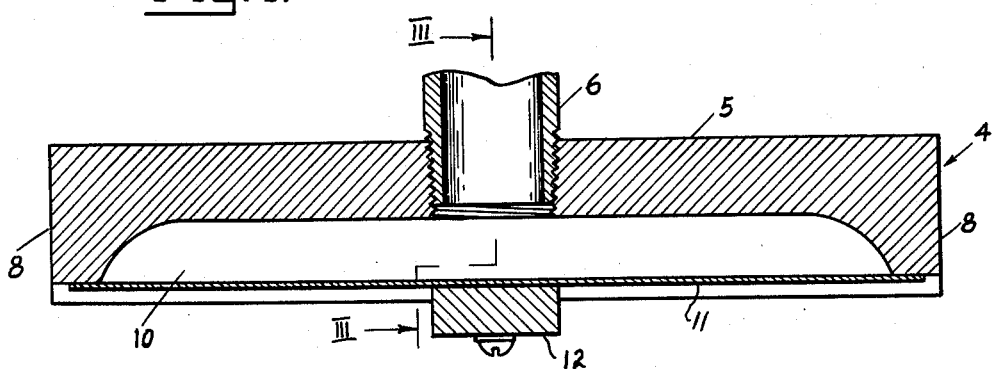
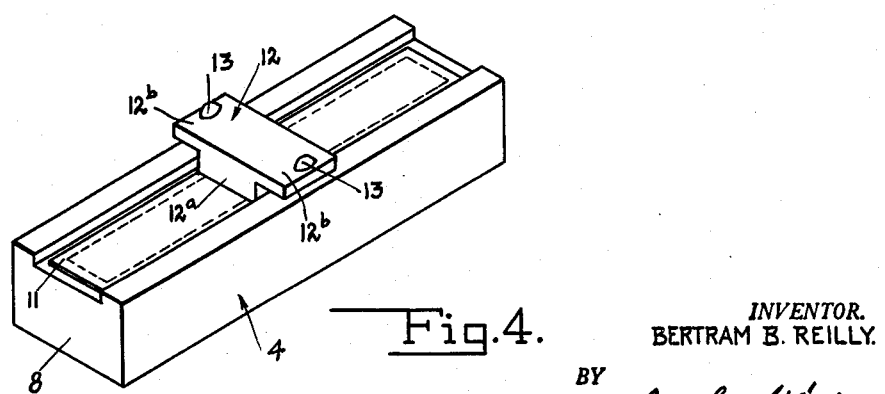
INVENTOR.
BERTRAM B. REILLY.
BY Christy, Parmelee & Strickland
ATTORNEYS.

3,182,978
SEWAGE TREATING APPARATUS AND AIR DIFFUSER FOR USE THEREON
Bertram B. Reilly, Pittsburgh, Pa., assignor to Dravo Corporation, Pittsburgh, Pa., a corporation of Pennsylvania
Filed Aug. 2, 1961, Ser. No. 128,889
1 Claim. (Cl. 261—124)

This invention relates to the treatment of sewage and is for a sewage treatment plant of the type in which air is diffused into a body of sewage and for a diffuser for diffusing air into the sewage being treated.

Certain processes for the treatment of sewage and the purification of waste water as practiced in the art involve the introduction of the sewage into a relatively deep vessel where solids in the sewage may settle and wherein periodically air is introduced into the bottom of the vessel to agitate the contents and aerate them followed by another period in which the contents are quiescent.

In apparatus of this kind, considerable difficulty is encountered in preventing the air diffusers from becoming clogged with solid material during the period that sedimentation is taking place and while no air is being diffused into the material. The present invention has for its object to provide a sewage plant with a diffuser which will not become clogged and which during the operation of the diffuser will allow the air to escape as relatively large bubbles rather than as diffused finely divided bubbles.

To this end my invention contemplates the provision of a diffuser designed to be attached to the end of an air inlet pipe and submerged in the treating tank close to the bottom, the diffuser comprising a body enclosing an air chamber, the body having an open face. The open face of the air chamber is closed by a strip of resilient material which is preferably secured to the body of the diffuser between its ends and so arranged that when air under pressure is introduced into the diffuser, it will flex the strip sufficiently to allow the air to escape. Then as the pressure in the chamber momentarily drops with the escape of air, the spring strip tends to close and reopen again as the pressure builds up, so that it automatically valves the air so as to form a succession of relatively large bubbles. In use the strip oscillates or pulsates valving the escape of air into the surrounding liquid. When the air is shut off, the strip is held against the open face of the body both by its own resilience and by hydrostatic pressure and there are no small orifices to become choked or clogged due to inwardly flow of sewage and the subsequent supply of air to the diffuser dislodges any accumulations that may be present around the leaf-spring.

The invention may be more fully understood by reference to the accompanying drawings in which:

FIG. 1 is a schematic view showing in vertical transverse section a sewage treating tank with a pair of diffusers embodying the present invention therein;

FIG. 2 is a longitudinal vertical section through the diffuser itself, the section being in the plane of line II—II of FIG. 3;

FIG. 3 is a transverse vertical section through the diffuser, the section being in the plane of line III—III of FIG. 2; and FIG. 4 is an inverted perspective view of the diffuser.

Referring to the drawings, 2 designates a sewage treatment tank, which is usually relatively deep compared to its area. Typically it may be as much as fifteen feet deep. As explained above, in the particular process for which the apparatus is especially designed, an accumulation of sewage with the customary water content is discharged into the tank 2 and is allowed to stand in a quiescent state for a period of time. Air is then diffused into the liquid adjacent the bottom to rise through the liquid and escape at the surface. The air bubbles, in addition to aerating the contents of the tank, agitate the sewage and the sediment at the bottom of the tank and induce a stirring action in the water. Therefore, it is desired to release the air in a manner to produce large bubbles rather than diffuse it as a stream or streams of small bubbles.

According to the present invention, one or more diffusers 3 for the introduction of the air are provided near the bottom of the tank. Each diffuser 3 comprises an elongated generally rectangular body 4 having a closed top 5 in which is a threaded opening into which an air supply pipe 6 is screwed. In the drawings I have shown two such diffusers with the pipes 6 connected into a common main air supply pipe 6a, which is connected with a source of high pressure air, but there may be any desired number of the diffusers.

Each diffuser has depending solid side walls 7, and imperforate end walls 8. The lower face of the side walls are shouldered from one end of the body to the other, providing recessed seating surfaces or inverted ledges 9. The end walls 8 terminate at the level of the ledges 9, and also form seating surfaces, as hereinafter explained. The interior of the body is hollow, providing an elongated air chamber 10 therein. A typical diffuser is several inches long, as for example about seven inches in length, this dimension being mentioned only to give some approximation of the size and not because it is critical while the width of the diffuser as seen in FIG. 3 is substantially less. The body of the diffuser is preferably formed of aluminum or rust resisting and corrosion resistant rigid material or plastic.

There is a thin flat strip of resilient stainless steel or like metal 11 over the open bottom face of the body, this strip resting on the ledges 9 between the vertical shoulders at the bottom edges of the side walls and its ends bear against and seat against the edges of the end walls 8 of the body. The strip is clamped in place at the longitudinal center of the diffuser by a strip retainer 12, this retainer having a thick intermediate portion 12a to fit between the shoulders of the side walls and bear against the strip 11 and it has ears 12b at each end which overlap the bottom faces of the side walls of the diffuser. Machine screws or bolts 13 pass through the ears 12b and are screwed into the side walls of the diffuser body and hold the retainer 12 in position to clamp the strip 11 flat against the ledges or seat areas 9 and end walls 8.

Thus while the strip is immovably clamped in place between its ends, its ends are free to flex or vibrate transversely to its length as air pressure builds up in the chamber 10. As the ends flex away from the seats, air escapes, and the strip springs back against its seat on the ledges 9 and the edges of the end walls 8. Desirably this flexing of the ends is in the nature of an oscillating valving action, producing, when the diffuser is immersed and adequate air supplied thereto, a fairly regular succession of large bubbles at each end of the diffuser.

When the liquid is quiescent and no air is supplied to the diffuser, the spring strip 11 is seated to exclude solid matter—at least of any considerable size—and there are no small orifices or ports to become clogged. The device is self-cleaning since the motion of the flexible strip will dislodge or break up any accumulation on or around the diffuser, and should water seep into the chamber 9 and air supply pipes when the air pressure is down, it will quickly be blown out of the diffuser when air is again supplied.

The general action of the free ends of the strip 11 may be roughly compared to that of a reed in a wind instrument except that the vibration is damped each time the strip seats on the ledges 9 instead of its being free to oscillate in each direction from a neutral plane and this produces the intermittent valving action that results in the formation of a succession of relatively large bubbles. The relatively great length of the strip in comparison to its width is important to securing the desired action.

While I have shown the diffuser in an inverted position, it may be used in any upright position where there is any advantage in so positioning it. Any number of diffusers may be employed, the drawing being schematic to indicate that there may be more than one. By making the strip 11 of stainless steel it has the desired inherent resilience and may be used for long periods of time without being corroded. At the same time, it is merely clamped in place and may be replaced when necessary. The strip should be thick enough to withstand distortion under the hydrostatic or air pressures to which it may be subjected but not so heavy as to lack resilience to the extent here required. I have found strip metal of about 1/32" thickness, or slightly less to be quite satisfactory in the diffuser here shown.

While I have shown and described one embodiment of my invention, the invention may be otherwise embodied and it will be understood that various changes and modifications may be made therein within the contemplation of the following claim.

I claim:

A diffuser for admitting air to a liquid in which it is submerged comprising an elongated box-like hollow body having side and end walls and one closed face and one face which is open, the side walls each having a ledge therealong, the end walls terminating in a plane flush with the level of the ledges, a thin flat strip of resilient metal covering the open face of the body with its edges resting on the ledges and its ends overlapping and seating on the end walls of the body, a retainer intermediate the ends of the body clamping the central area of the strip only against the ledges while the ends are free to flex away from the ledges and thereby vary the area of the air escape passage from the body as the degree of flexing of the strip changes and means providing an air inlet connection through which air under pressure may be supplied to the interior of the body.

References Cited by the Examiner

UNITED STATES PATENTS

| | | | |
|---|---|---|---|
| 1,677,502 | 7/28 | Sweetland | 261—124 |
| 2,192,406 | 3/40 | Ludington | 259—168 |
| 2,415,048 | 1/47 | Sharp | 261—124 |
| 2,670,739 | 2/54 | McNeill | 261—81 |
| 2,687,287 | 8/54 | Coppock | 261—124 |
| 2,986,383 | 5/61 | Lowry | 261—124 |

FOREIGN PATENTS 484,914   7/52   Canada.

HARRY B. THORNTON, *Primary Examiner.*

HERBERT L. MARTIN, *Examiner.*